United States Patent [19]
Baxter et al.

[11] Patent Number: 5,423,518
[45] Date of Patent: Jun. 13, 1995

[54] LANDING GEAR FOR VEHICLE

[75] Inventors: Bobby G. Baxter; Jeffrey E. Ditto, both of Warrenton, Mo.

[73] Assignee: The Binkley Company, Warrenton, Mo.

[21] Appl. No.: 224,667

[22] Filed: Apr. 7, 1994

[51] Int. Cl.$^6$ .............................................. B60S 9/02
[52] U.S. Cl. ....................................... 254/419; 254/425
[58] Field of Search ................ 254/419, 420, 422, 424, 254/425, 98, 103, 100, 134; 248/352, 354.5; 280/762, 763.1, 765.1, 766.1

[56] References Cited

U.S. PATENT DOCUMENTS

| | | | |
|---|---|---|---|
| 2,069,012 | 1/1937 | Lynes | 254/425 |
| 2,926,889 | 3/1960 | Obes. | |
| 4,635,904 | 1/1987 | Whittingham. | |
| 4,796,864 | 1/1989 | Wilson. | |
| 4,842,252 | 6/1989 | McMahan | 254/424 |
| 4,903,977 | 2/1990 | Baxter. | |

Primary Examiner—Robert C. Watson
Attorney, Agent, or Firm—Senniger, Powers, Leavitt & Roedel

[57] ABSTRACT

Landing gear for a vehicle comprising a tubular body for attachment to the vehicle, an adjustable-length leg slidable and finely adjustable in the body comprising an inner member slidable and coarsely adjustable in an outer member, two locking pins for locking the inner member in coarse adjusted position relative to the outer member, and a combination handle and spring biasing the pins to their locking position and movable to move them to retracted position.

18 Claims, 11 Drawing Sheets

LANDING GEAR FOR VEHICLE

BRIEF SUMMARY OF THE INVENTION

This invention relates to landing gear for a vehicle and more particularly to landing gear for use on a trailer for supporting the trailer adjacent its forward end when the trailer is uncoupled from the vehicle used for pulling the trailer and parked, such a landing gear also being referred to as a "jack".

Reference may be made to such U.S. Pat. Nos. as 2,926,889, 4,635,904, 4,796,864 and, 4,903,997 for examples of prior art relating to landing gear of the general type of this invention, and particularly U.S. Pat. No. 4,796,864. The latter shows a landing gear comprising a body (the outer and upper tube) for attachment to a vehicle (e.g. a trailer gooseneck as shown in FIG. 2) and an adjustable-length leg moveable up and down relative to the body, the adjustable length leg comprising an outer tubular member and an inner tubular member telescopically slidable in the outer tubular member to one of a plurality of adjusted positions relative to the outer tubular member for adjustment of the length of the leg, and a pin carried by the outer tubular member moveable in and out of one of a series of pin-receiving openings in the inner member for locking the inner member in any one of a plurality of adjusted positions lengthwise of the outer tubular member. It has been observed that with a single locking pin, the inner member may cant relative to the outer member. Reference is also made to a landing gear with a similar adjustable-length leg and with two locking pins at opposite sides thereof for avoiding canting, which has been on sale for more than a year by Holland Hitch Co. of Holland, Mich. (the Holland "TWIN PIN" landing gear), Holland Hitch Co. being the parent of the assignee of this invention, namely, The Binkley Company of Warrenton, Mo. The Holland "TWIN PIN" landing gear has performed satisfactorily, but is relatively expensive to manufacture.

Among the several objects of this invention may be noted the provision of a landing gear having two locking pins like the aforementioned TWIN PIN landing gear, of improved construction for economy in the provision of parts, including reduction in the number of parts, and for facilitating assembly of parts for economy in manufacture.

In general, the improved landing gear of this invention comprises a body for attachment to a vehicle and an adjustable-length leg carried by the body for up and down movement relative to the body as attached to the vehicle. The adjustable-length leg comprises an outer tubular member and an inner tubular member telescopically slidable in the outer tubular member to any one of a plurality of adjusted positions relative to the outer tubular member for adjustment of the length of the leg. The landing gear includes means for fine adjustment of the leg as a whole lengthwise relative to the body. It further includes means for releasably locking the inner member in any one of the said plurality of adjusted positions relative to the outer tubular member, comprising a first series of pin-receiving openings in one side of said inner member spaced at intervals along its length and a second series of pin-receiving openings in the opposite side of said inner member spaced at intervals along its length corresponding to the spacing of the openings of the first series, each opening of each series being aligned with an opening of the other. The outer tubular member of the adjustable leg has first and second holes at opposite sides thereof, the first hole being coplanar with the first series of pin-receiving openings in the inner member, the second being coplanar with the second series of pin-receiving openings in the inner member. First and second tubular pin guides extend laterally outwardly from the outer tubular member coaxial with the holes in the outer tubular member at opposite sides of the outer tubular member, each pin guide having an open inner end at the outer tubular member and an outer end spaced outwardly from the outer tubular member. A first pin is axially slidable in the first pin guide between a locking position extending into one of the pin-receiving openings of the first series in the inner member and a retracted position and a second pin is axially slidable in the second pin guide between a locking position extending into one of the pin-receiving openings of the second series in the inner member and a retracted position. The pins are coaxial, each having an outer end portion adjacent the outer end of the respective guide. The landing gear further includes a handle comprising a generally U-shaped spring member having a hand grip portion and spring arms extending laterally from the hand grip portion, the spring arms having free end portions interconnected with the outer end portions of the pins and exerting a spring bias on the pins tending to move them inwardly to their locking positions. The handle is swingable about the axis of the pins between a first and a second position, and means is provided for effecting outward movement of the pins in the guides from their locking (inner) position to their retracted (outer) position against the said spring bias of the arms on the pins on swinging movement of the handle from its first to its second position and allowing inward movement of the pins in the guides from their retracted to their locking position under the spring bias of the arms on the pins on swinging movement of the handle from its second to its first position.

Other objects and features will be apparent and in part pointed out hereinafter.

BRIEF DESCRIPTION OF THE DRAWINGS

Corresponding reference characters indicate corresponding parts throughout several view of the drawings.

DETAILED DESCRIPTION

Referring to the drawings, a landing gear of this invention for a vehicle such as a semi-trailer (not shown) is shown to comprise a body 1, more particularly a steel tube of square cross-section, for attachment to the vehicle in suitable well-known manner, e.g. by means of a bracket (not shown), in position for supporting the vehicle when the vehicle is parked, and an adjustable-length leg designated in its entirety by the reference numeral 3 (which may be referred to as a "drop leg") carried by the body for up and down movement relative to the body. The adjustable-length leg comprises an outer (upper) tubular leg member 5 and an inner (lower) tubular leg member 7 telescopically slidable in the outer tubular member 5 to any one of a plurality of adjusted positions relative to the outer tubular member for adjustment of the length of the leg. As herein illustrated, the outer tubular number 5 comprises a steel tube of square cross-section having a sliding fit in the tubular body 1 (which is of square cross-section), and the inner tubular leg member 7 comprises a steel tube of square cross-section having a sliding fit in the outer tubular leg member 5. Members 1, 5 and 7 being of square cross section, member 5 is held against rotation in member 1 and member 7 is held against rotation in member 5. At 9 is generally indicated means of this invention for re-leasably locking the inner member 7 in any one of a plurality of adjusted positions lengthwise of the outer member 5. The inner leg member 7 has a foot 11 at its lower end constituted by a square steel plate and is shown as biased upwardly relative to the outer leg member 5 by a coil tension spring 13 toward a raised retracted position in the outer leg member 5 wherein the foot 11 engages the lower end of the outer leg member. At 15 (FIG. 2) is generally indicated means for effecting a relatively fine up and down adjustment of the adjustable-length leg 3 as a whole relative to the body 1.

The locking means 9 comprises a first series generally designated 17 of pin-receiving openings 19 in one side of the inner tubular leg member 7 spaced at intervals along its length, and a second series generally designated 21 of pin-receiving openings 23 in the opposite side of the inner tubular leg member spaced at intervals along its length corresponding to the spacing of the openings of the first series. Each opening of each series is aligned and paired with an opening of the other. The outer tubular leg member 5 has first and second holes 25 and 27 at opposite sides thereof, the first hole 25 being coplanar with the first series 17 of pin-receiving openings 19 in the inner member, the second hole 27 being coplanar with the second series 21 of pin-receiving openings 23 in the inner member. The outer tubular leg member has first and second tubular pin guides 29 and 31 extending laterally outwardly therefrom coaxial with the holes 25 and 27 in the outer tubular member 5 at opposite sides of the outer tubular member. Each of these pin guides has an open inner end at the outer tubular member 5 and an open outer end spaced outwardly from the outer tubular member. A first pin 33 is axially slidable in the first pin guide 29 between an inner locking position (FIGS. 2 and 3) extending into one of the pin-receiving openings 19 of the first series 17 of openings in the inner member 7 and an outer retracted position (FIGS. 4 and 11) clear of the inner member 7. A second pin 35 is axially slidable in the second pin guide 31 between an inner locking position (FIGS. 2 and 3) extending into one of the pin-receiving openings 23 of the second series 21 of openings in the inner member 7 and a retracted position (FIGS. 4 and 11) clear of the inner member 7. The pins 33 and 35 are coaxial. In their retracted position, their outer ends 33a, 35a (see FIG. 4) extend out of the outer ends of the pin guides 29, 31.

Figure 1:
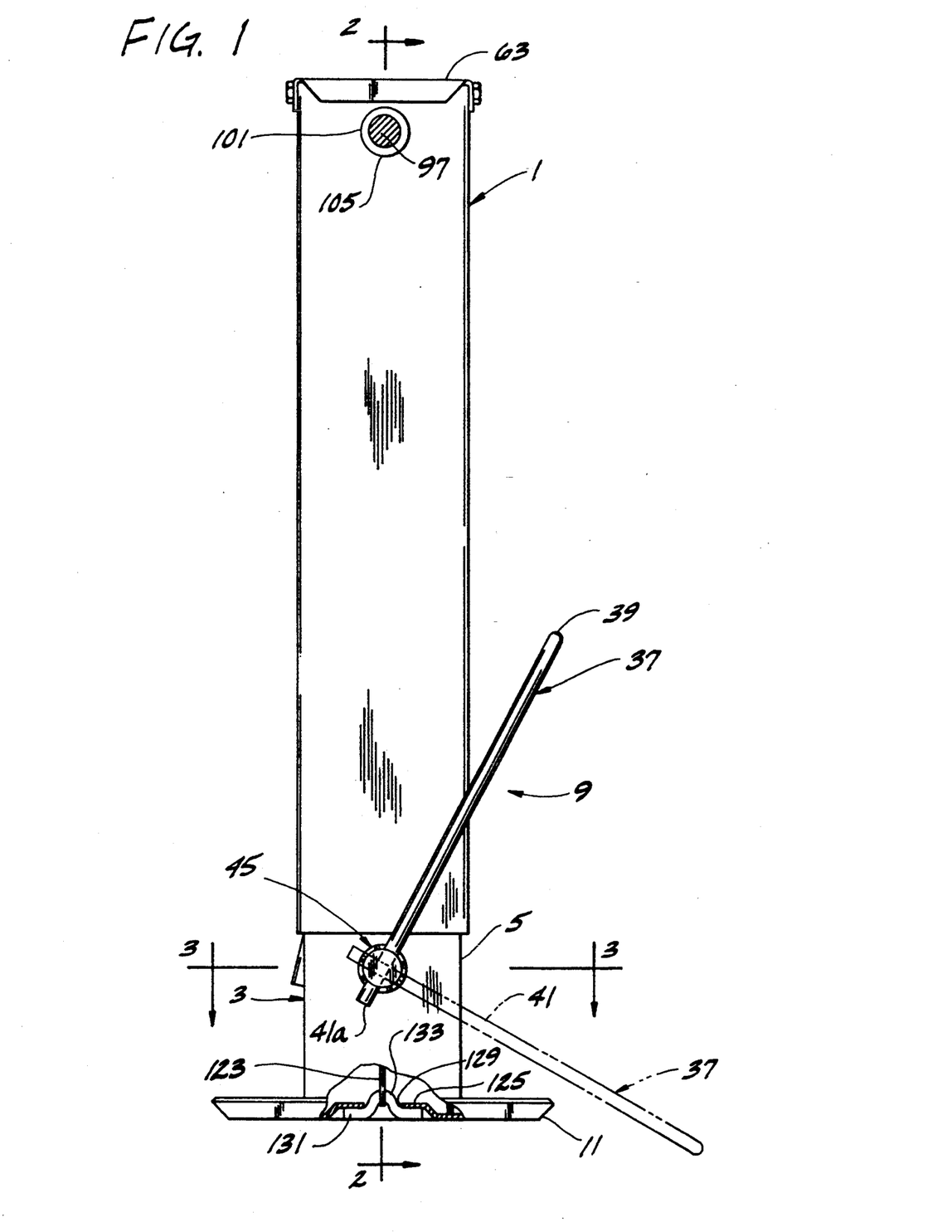
FIG. 1 is view in side elevation of a landing gear of this invention, showing the adjustable-length leg thereof in its shortest length condition and in its fully raised or retracted position; showing the handle of the landing gear in solid lines in its first position wherein the pins of the landing gear are in their inner locking position, and showing the handle in phantom in its second position wherein the pins are in their outer retracted position and with parts broken away and shown in section.
Figure 2:
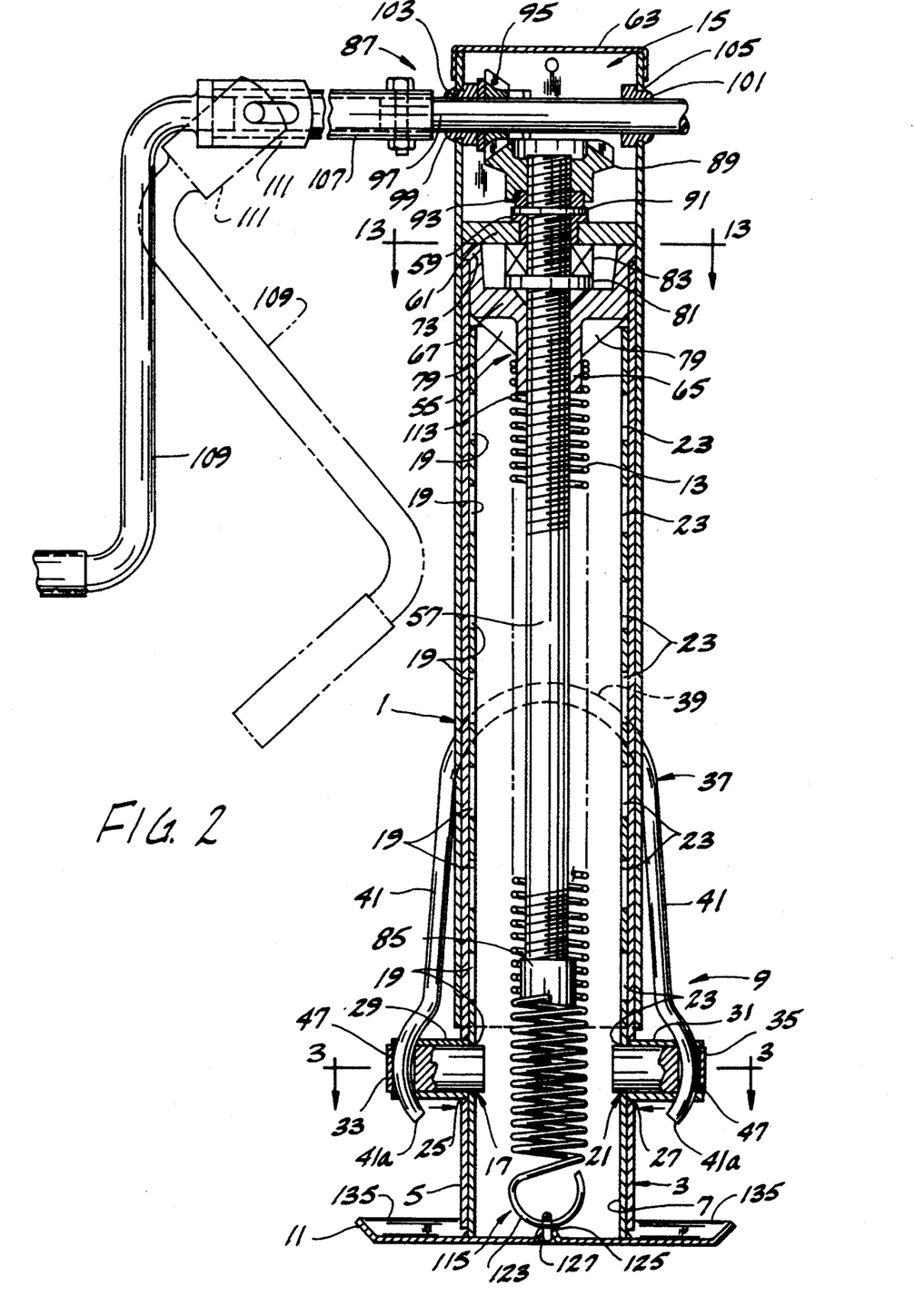
FIG. 2 is a central vertical section of the landing gear taken on line 2—2 of FIG. 1 showing a crank of the mechanism for fine adjustment of the adjustable-length leg as a whole in solid lines in an operating position and in phantom in a retracted position and showing the pins of the landing gear in their inner locking position.
Figure 3:
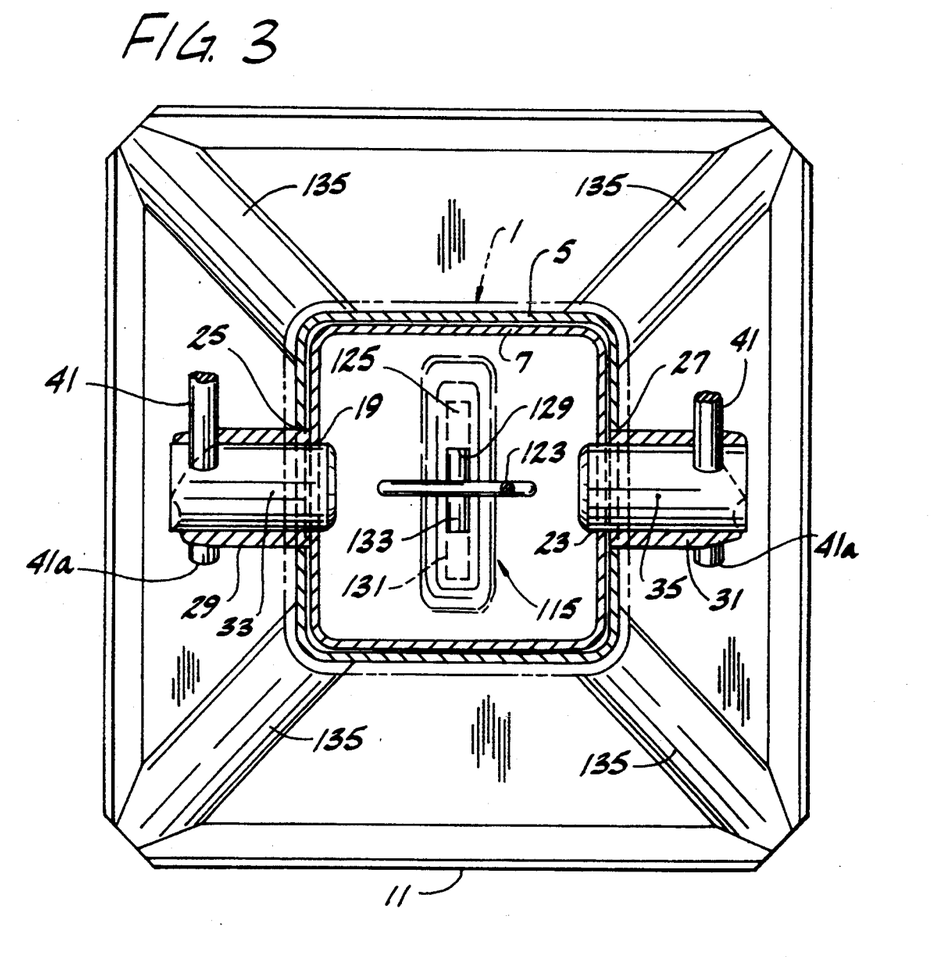
FIG. 3 is a horizontal transverse section on line 3—3 of FIGS. 1 and 2, also showing the pins of the landing gear in their inner locking position.
Figure 4:
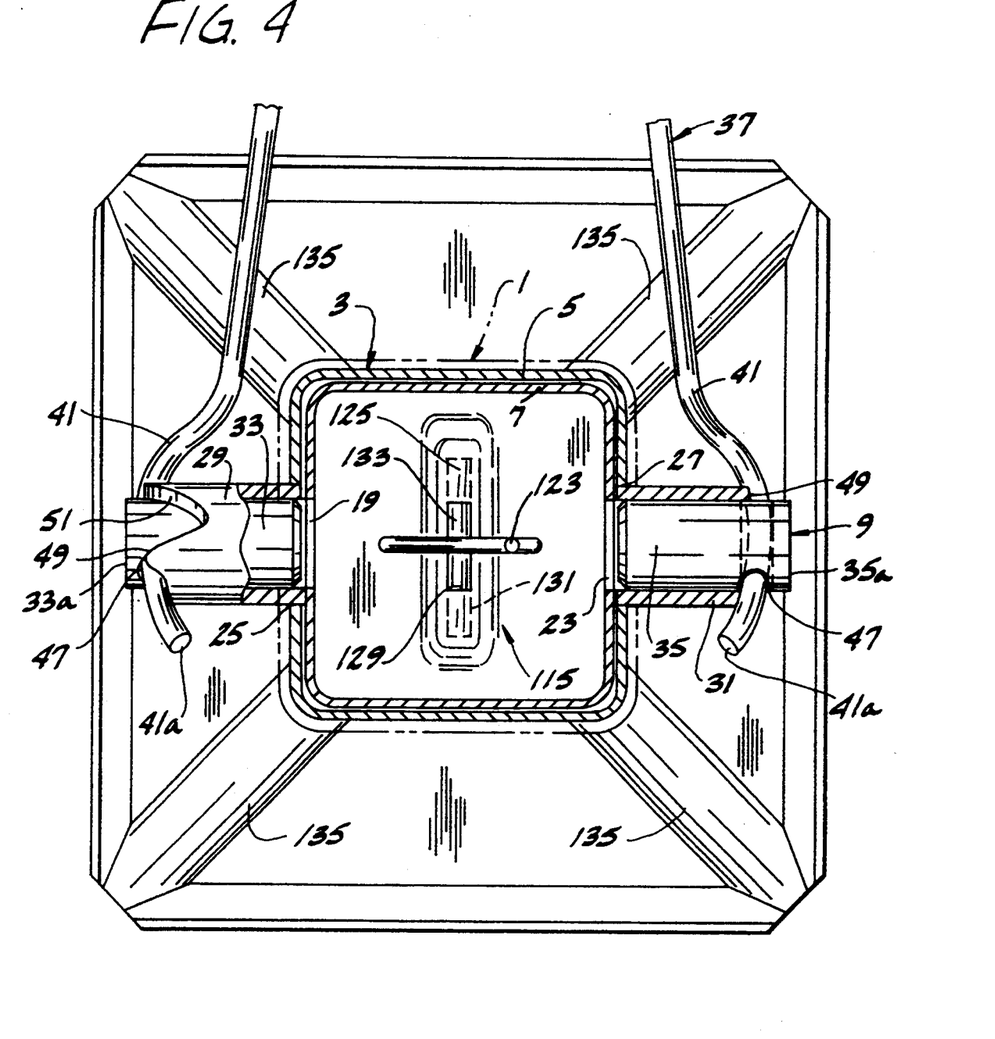
FIG. 4 is a view similar to FIG. 3 showing the pins in their outer retracted position.
Figure 11:
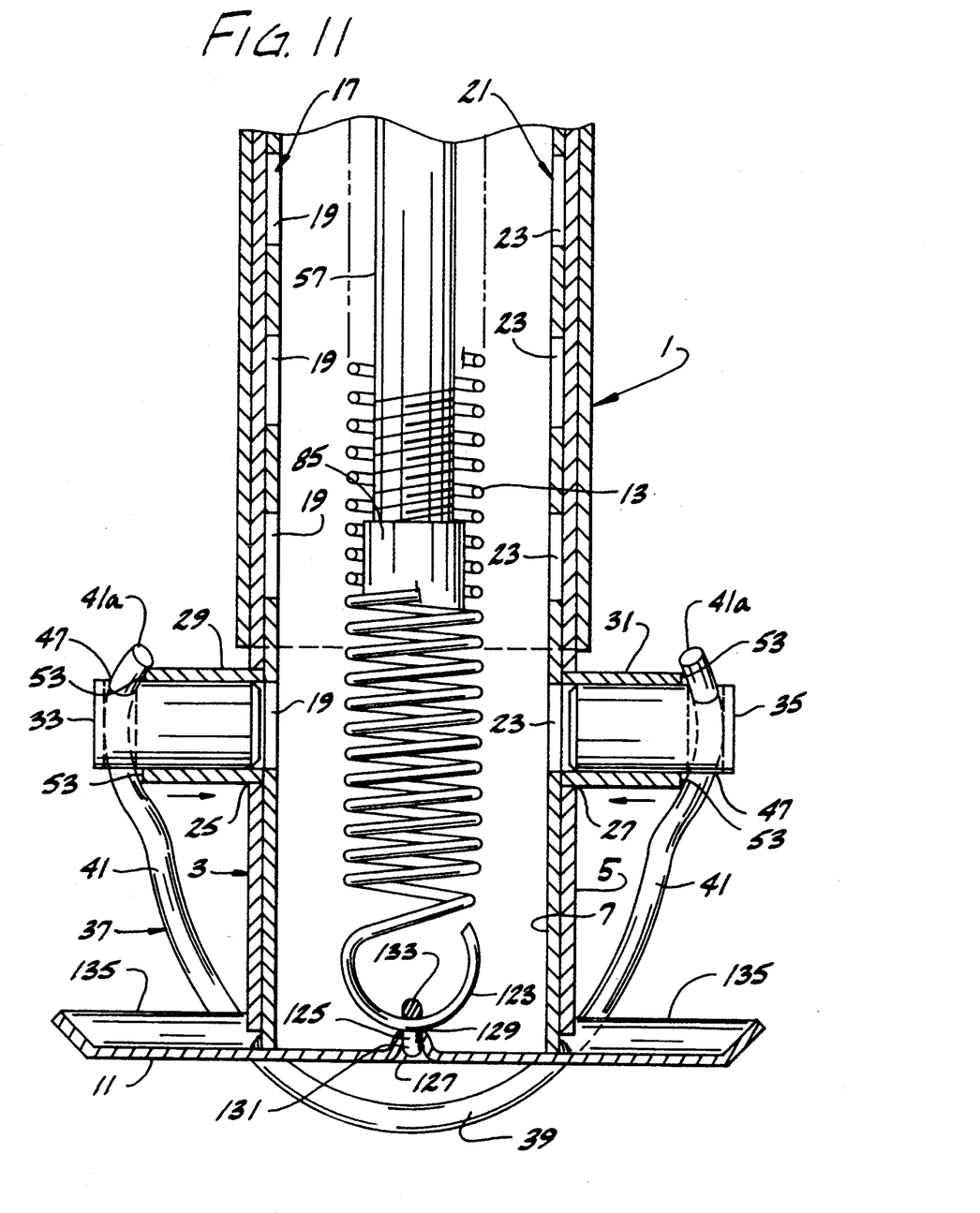
FIG. 11 is an enlarged fragment of FIG. 2 showing the pins of the landing gear in their outer retracted position for extension of the inner tubular member of the adjustable-length of the landing gear relative to the outer tubular member of the landing gear.
Figure 12:
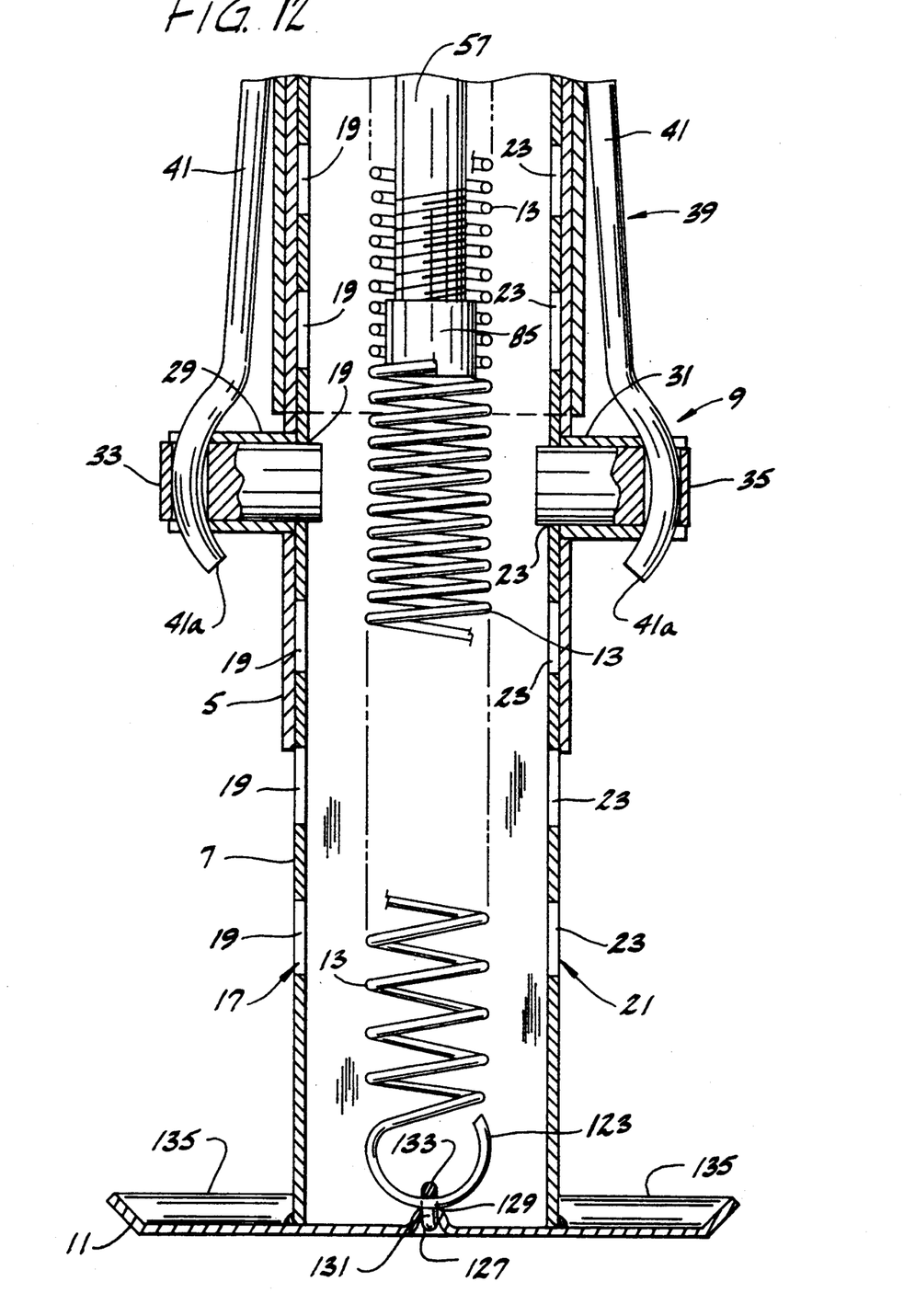
FIG. 12 is a view similar to FIG. 11 showing the inner tubular member of the adjustable-length leg in an extended position and showing the pins locking the inner tubular member in said extended position.
Figure 13:
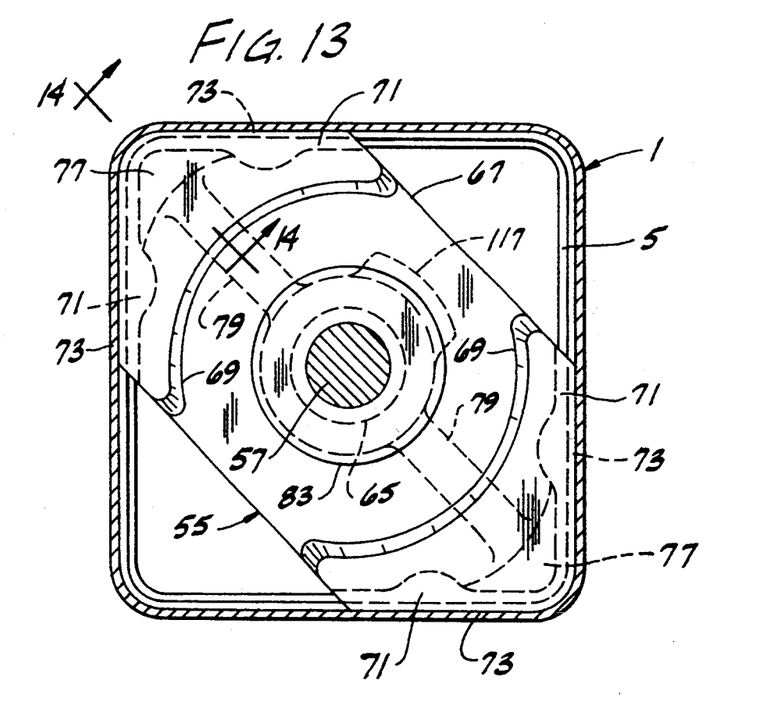
FIG. 13 is an enlarged horizontal section on line 13—13 of FIG. 2.
Figures 14, 15:
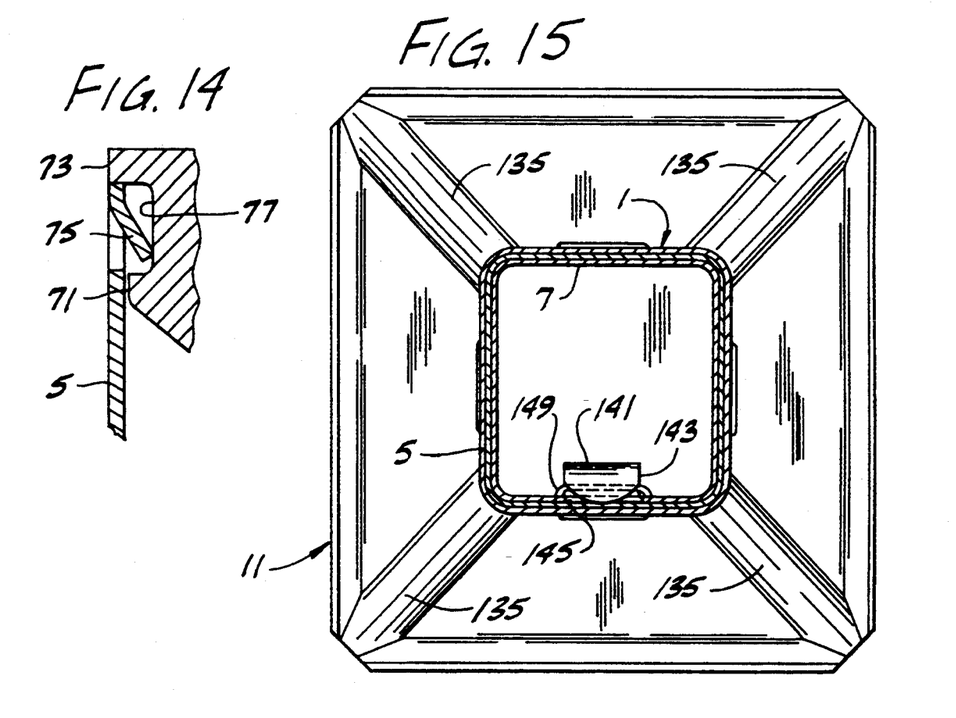
FIG. 14 is an enlarged vertical section on line 14—14 of FIG. 13.
FIG. 15 is an enlarged horizontal section on line 15—15 of FIG. 6 showing means of this invention for preventing the inner tubular leg member from sliding all the way out of the outer tubular leg member, parts being omitted.

At 37 is indicated a handle comprising a generally U-shaped spring member having a hand grip portion designated 39 and spring arms each designated 41 extending laterally from the hand grip portion. The spring arms 41 have free end portions 41a which are curved as shown in FIGS. 2, 4 and 11 interconnected with the outer end portions of the pins 33 and 35 and exerting a spring bias on the pins tending to move them inwardly (as indicated by the arrows in FIGS. 2 and 11) to their locking positions. The handle 37 is swingable about the axis of the pins between a first position (its raised position shown in solid lines in FIG. 1) and a second position (its lowered position shown in phantom FIG. 1).

At 45 is generally indicated means for effecting outward movement of the pins 33 and 35 in the guides 29 and 31 from their inner locking position (FIGS. 2 and 3) to their outer retracted position (FIGS. 4 and 11) against the spring bias on the pins of the spring arms 41 of the handle 37 on swinging movement of the handle from its first (raised) position (shown in solid lines in FIGS. 1, 2 and 3) to its second (lowered) position (shown in phantom in FIG. 1 and in solid lines in FIG. 11) and allowing inward movement of the pins in the guides from their retracted to their locking position under the said spring bias of the arms on the pins on swinging movement of the handle from its second to its first position. The pins 33 and 35 are rotatable in the guides 29 and 31 as well as axially slidable in the guides. The curved end portions 41a of spring arms 41 of the handle 37 extend through holes 47 in the outer end portions of the pins so that the pins rotate on their axis in the pin guides on swinging the handle one way or the other. The means 45 for effecting the outward movement of the pins from their inner locking position of FIG. 3 to their outer retracted position of FIG. 4 comprises a cam formation generally designated 49 (see FIGS. 3, 4 and 7–9) at the outer end of each guide, the curved end portions 41a of the spring arms engaging these cam formations and being cammed out to move the pins out when the handle is swung from its first to its second position, and being allowed to move in when the handle is swung from its second to its first position. The cam formation 49 at the outer end of each guide comprises a pair of generally V-shaped notches 51 in the end of the guide spaced at 180° intervals around the end of the guide, the end of each arm 41 riding up one of the sides of the respective notches and thus cammed outwardly when the handle is swung from its first to its second position. The cam formation at the outer end of each guide includes a pair of detent notches 53 located between the V-shaped notches 51, the curved free ends of the arms 41 being received in the detent notches for detaining the handle in its second position wherein the pins are retracted (see FIG. 11). The arrangement is such that, for parking the vehicle on which the landing gear is used, the inner leg member 7 may be released to allow it to be pushed down relative to the outer leg member 5, then pushed down against the return bias of the spring 13 to the point where the foot 11 engages the ground, then released to be moved upward by the spring 13 to the point where the pins 33 and 35 slide into locking position in the first set of pin-receiving openings 19, 23 in the inner member 7 which they encounter, and means 15 then operated to effect a fine adjustment bringing the foot back down into engagement with the ground.

In detail, the outer leg member 5 has a nut designated in its entirety by the reference numeral 55 secured thereto at its upper end, the outer leg member 5 extending down from the nut in the tubular body 1 of the landing gear. The nut is threaded on an adjusting screw 57 which extends down from adjacent the upper end of the body 1 within the inner tubular leg member 7 on the vertical axis of the body 1 and the two leg members 5 and 7 to a point somewhat above the level of the pin guides 29 and 31. The screw is journalled adjacent its upper end in a plastic bushing 59 held in a plate 61 secured in the body 1 some distance below the upper end of the body, which has a closure 63. The nut 55 is generally of T-shape, having an internally screw-threaded tubular stem 65 which is in screw-threaded engagement with the screw 57, a cross-head 67 at the upper end of the stem, and upwardly extending end wall formations each generally designated 69 at the outer ends of the head. Each of these end wall formations comprises two walls each designated 71 at right angles to one another. The cross-head 67 of the nut extends diagonally within the outer tubular member 5, the two end wall formations 69 fitting in diagonally opposite corners of the outer tubular member 5 (which is of square cross-section). Each end wall formation 69 has an outwardly extending lip 73 at its upper end (on both walls 71). The outer tubular member 5 has a slip fit on the outside of the walls 71 of the end wall formations and is secured to the nut by portions 75 of the outer tubular member struck in therefrom adjacent its upper end and fitting in recesses 77 in the end formations (making for quick and efficient assembly). Reinforcing gussets for the nut are indicated at 79. The nut 55, carrying the outer tubular leg member 5, is adapted to be driven up by the screw 57 to an upper limit wherein the upper face of the cross-head 67 of the nut engages a limit stop 81 constituted by a collar on the screw. A thrust bearing 83 is interposed between the plate 61 and the stop 81. At 85 is indicated a lower limit stop on the screw adjacent its lower end for limiting the downward travel of the nut on the screw.

At 87 is generally indicated means for driving the screw 57 comprising a bevel gear 89 secured on the upper end of the screw above a washer 91, with a lock 93 for locking the gear on the screw, and a bevel gear 95 meshing with the gear 89 fixed on a shaft 97 extending transversely of the body 1 journalled in bearings 99 and 101 received in openings 103 and 105 on opposite sides of the body adjacent its upper end. The shaft 97 extends out of the body 1 at one side thereof, having an extension 107 on which a crank 109 is pivoted at 111. The crank is moveable between the operating position in which it is illustrated in solid lines in FIG. 2 and the storage position in which it is illustrated in phantom in FIG. 2. When in operating position, it may be turned for rotating the shaft 97 to rotate gear 95 for driving gear 89 to rotate the screw 57 in one direction or the other to drive the nut 55 and the outer leg member 5 up and down for fine adjustment of the adjustable-length leg 3 (constituted by the leg members 5 and 7) up and down relative to the body 1.

The spring 13 surrounds the screw 57 in coaxial relation with respect to the screw and the nut 55, being secured at its upper end to the lower end of the tubular stem 65 of the nut as indicated at 113 and being secured at its lower end to the foot 11 at the lower end of the inner tubular leg as indicated at 115.

Figure 2A:
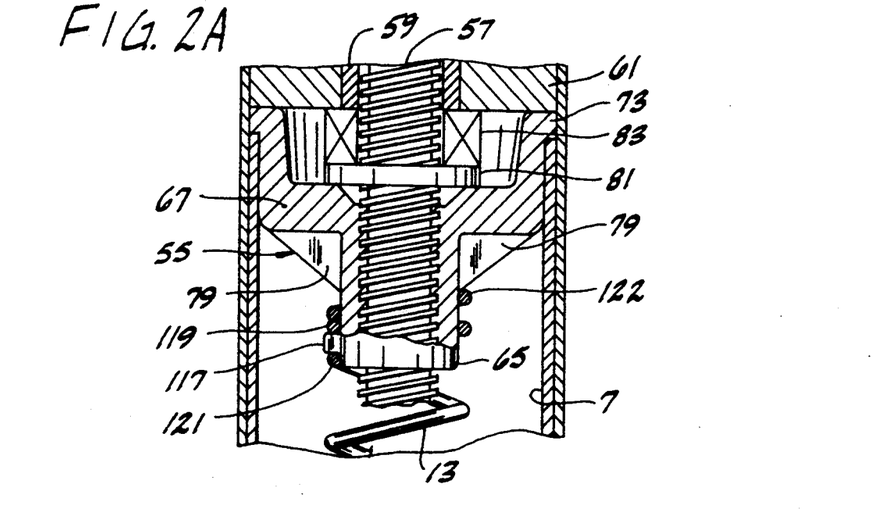
FIG. 2A is an enlarged fragment of FIG. 2.

The mode of securement at 113 of the upper end of the spring to the stem of the nut involves the formation on the tubular stem 65 of the nut adjacent its lower end of a boss 117 and the application of the upper end of the spring to the stem surrounding the stem with two adjacent convolutions 119 and 121 of the spring separated with one of these (119) above the boss engaging the boss to hold the spring from being pulled off the stem of the nut and the other (121) of the two separated convolutions below the boss, as shown in FIG. 2A. The spring has an end portion 122 bent away from the next adjacent convolution of the spring to facilitate what amounts to threading the upper end of the spring on to the stem 65. The mode of securement at 115 of the lower end of the spring involves the formation of the spring with an eye 123 at its lower end and the forming of the foot 11 with an upstruck rib 125 forming a downwardly opening groove 127 on a line extending through the center of the foot, with an opening 129 in the rib at the center of the foot. A clip 131 constituted by a short length of wire bent at the center of its length to have a central portion 133 of inverted U-shape is pocketed in the groove with the inverted U-shaped central portion 133 of the clip extending up through the opening 129, and extending through the eye 123, the latter extending underneath the inverted U-shaped central portion of the clip thereby interconnecting the lower end of the spring and the lower end of the inner leg member 7. The assembly is carried out by pulling the eye through the opening 129, passing the clip through the eye and then seating the clip in the groove, the clip being pulled up by the spring to the point where the portion 133 of the clip extends up through the opening 129, The foot 11 may be formed with upstruck ribs such as indicated at 135 extending diagonally from the corners of the foot terminating at the corners of the inner leg member 7 serving to center the foot on member 7.

Figure 5:
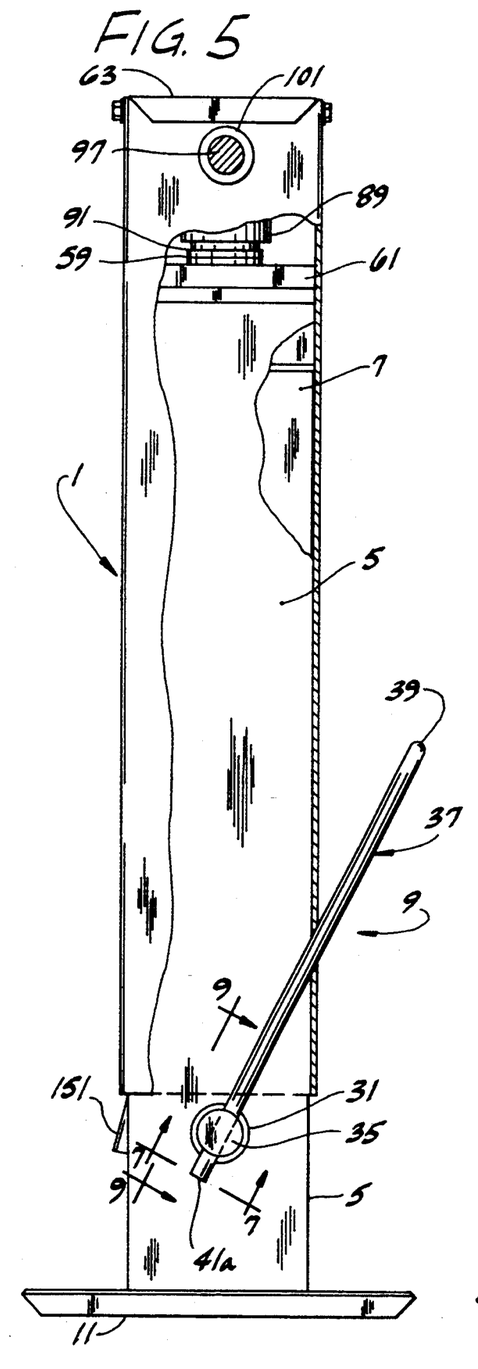
FIG. 5 is a view similar to FIG. 1 with the body of the landing gear broken away to show detail of the outer tubular member of the adjustable-length leg of the landing gear.
Figure 6:
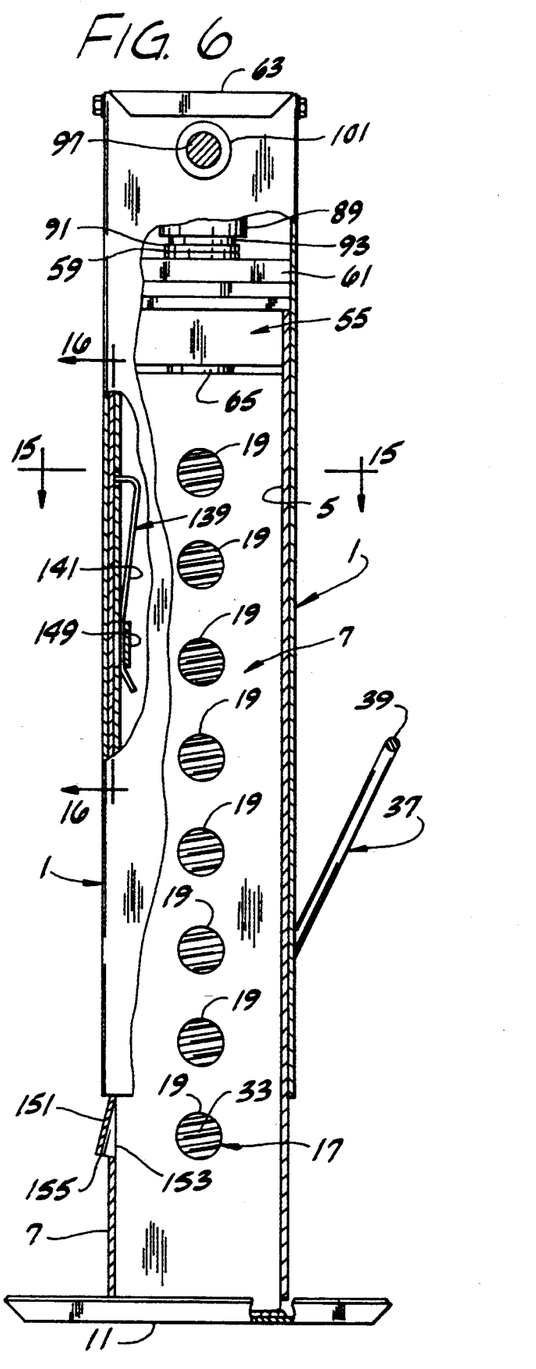
FIG. 6 is a view similar to FIG. 5 further broken away to show detail of the inner tubular member of the adjustable-length leg of the landing gear and other detail.
Figure 7:
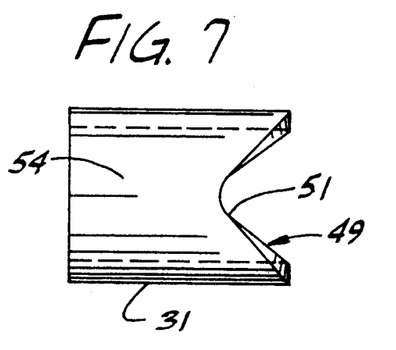
FIG. 7 is an enlarged view on line 7—7 of FIG. 5 of a pin guide of the landing gear.
Figure 8:
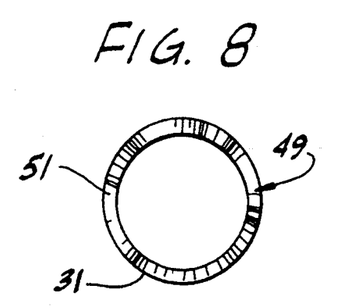
FIG. 8 is a view of the right end of FIG. 7.
Figure 9:
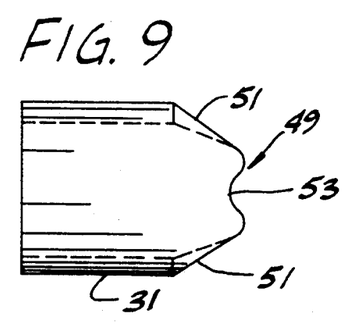
FIG. 9 is an enlarged view on line 9—9 of FIG. 5 of the pin guide (at 90° to FIG. 7)
Figure 10:
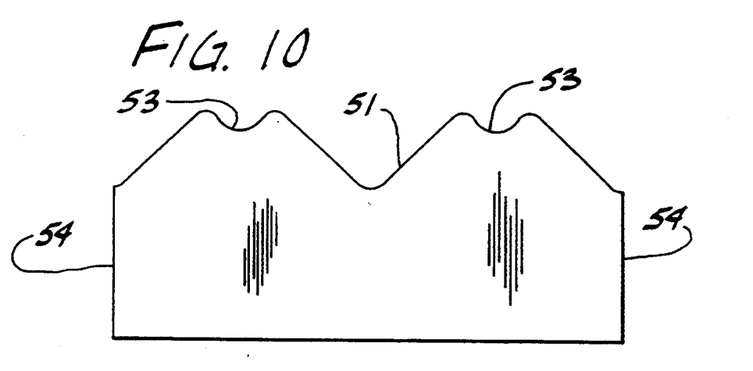
FIG. 10 is view of a sheet metal blank from which a pin guide is formed.
Figure 16:
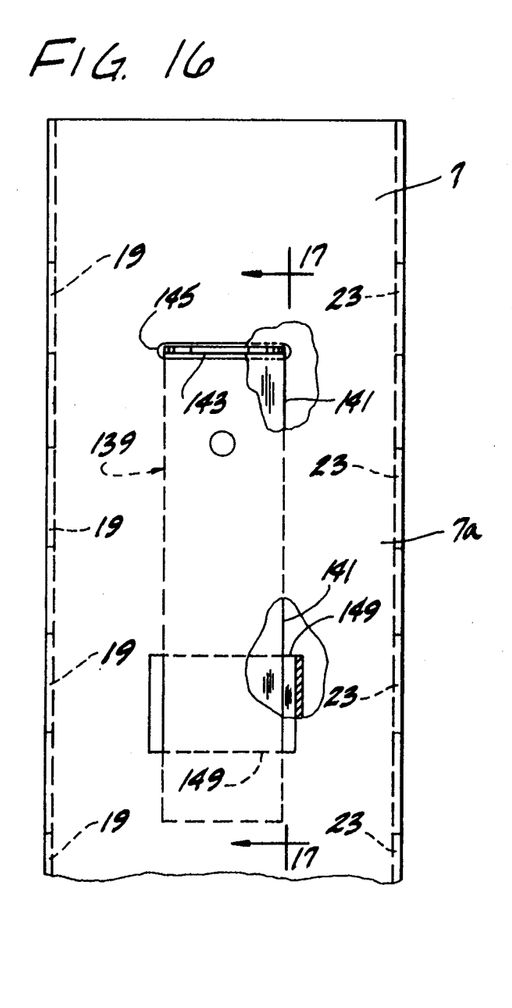
FIG. 16 is an enlarged view on line 16—16 of FIG. 6 with parts broken away.
Figure 17:
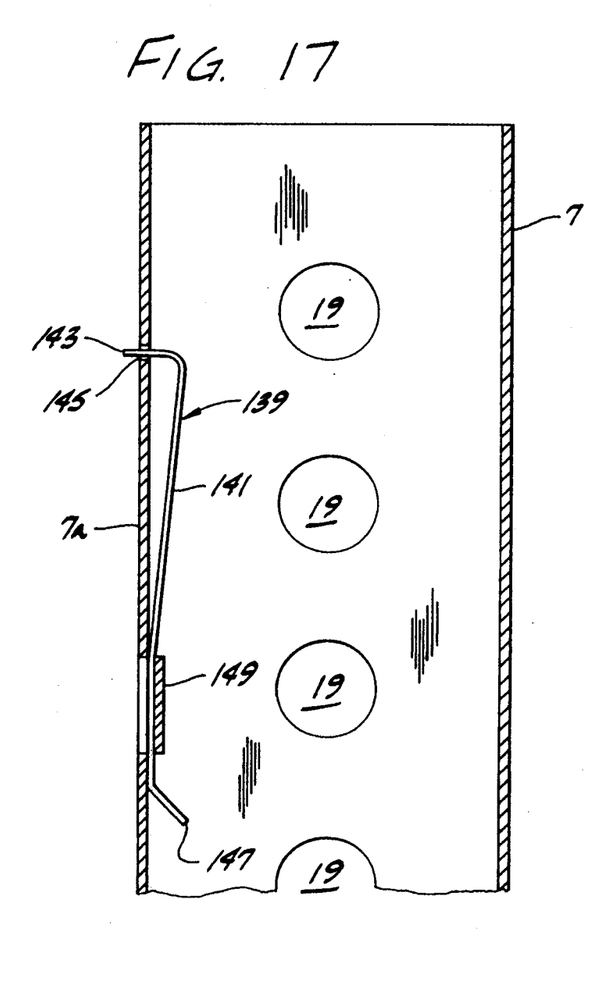
FIG. 17 is a vertical section on line 17—17 of FIG. 16.
Figure 18:
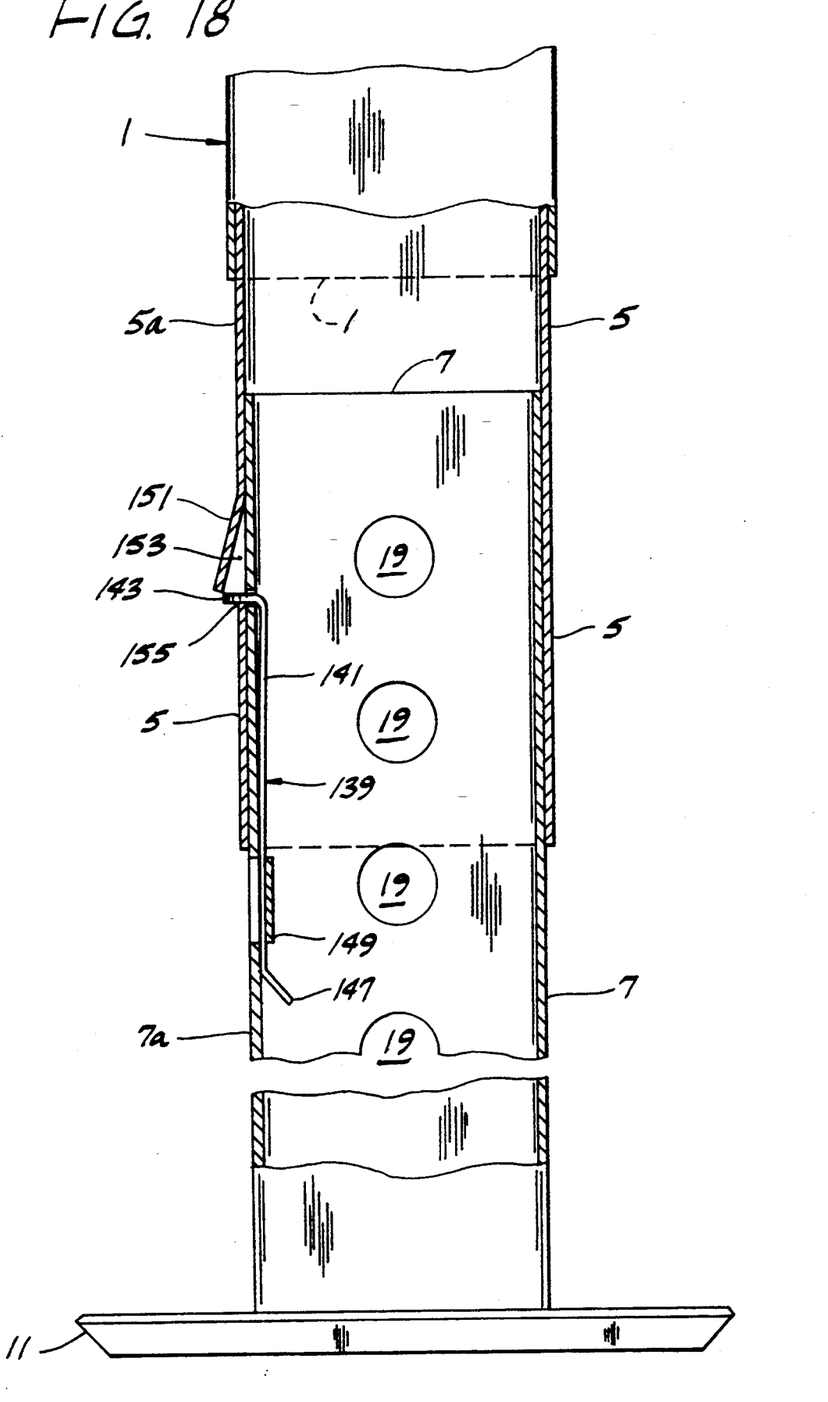
FIG. 18 is an enlarged fragment of FIG. 6 showing the inner tubular leg extended to its limit with respect to the outer tubular leg.

At 139 is generally indicated means of this invention for preventing the inner tubular leg member 7 from sliding all the way out of the outer tubular member 5. In particular, this means comprises a detent 141 constituted by an elongate spring steel strip mounted on the inside of wall 7a of the inner tubular leg member (a wall other than the wall having series 17 of openings 19 therein and other than the wall having series 21 of openings 23 therein), the strip being bent adjacent one end thereof (its upper end) to have a latching or locking finger 143 (see particularly FIGS. 16–18) extending outwardly at said end. Wall 7a has an opening 145 adjacent the upper end of the member 7. The detent (strip) 41 is mounted on the inside of wall 7a by sliding its other end, i.e. its lower end 147, into a flat loop 149 struck inwardly from the wall 7a to the point where the finger 143 snaps into the opening 145, it being understood that in carrying this out, the strip is bent as shown in FIG. 17. The lower end 147 of the strip is bent away from wall 7a. The outer tubular leg member 5 has a portion 151 struck out from its wall 5a overlying wall 7a of the inner tubular leg member 7 adjacent the lower end of member 7, providing a locking opening 153 in wall 5a, the lower end of this opening being designated 155. The struck-out portion 151 is angled outwardly and downwardly with respect to wall 5a from the upper end of the opening 153 and constitutes a cam engageable by the finger 143 when the leg member 7 is slid up in the leg member 5 to cam the finger 143 inward to its retracted position shown in FIG. 6 wherein the tip of the finger 1 is located in the opening 143 in withdrawn position relative to the locking opening 153 in leg member 7. The arrangement is such that when the inner leg member 7 is in any position relative to the outer leg member 5 wherein the hole 145 is above the upper end of the locking opening 153, the tip of the finger 143 engages the inside surface of wall 5a of the outer leg member, thereby occupying the retracted position in which it is shown in FIG. 6, and being inherently biased by reason of the spring characteristic of the detent strip 141 to move out to its locking position protruding out of the inner leg member 7 in which it is shown in FIG. 18. If the inner leg member 7 should be slid down out of the outer leg member to a position where the finger 143 comes into register with the locking opening 153, the finger 143 springs out to its said locking position and is thereupon engageable with the lower end 155 of opening 153 to prevent further extension of the inner leg member relative to the outer leg member 5. On sliding the inner member 7 back up relative to the outer member 5, the finger is cammed back to its retracted position by the cam 151. The cam 151 also acts as a stop engageable with the lower end of the body 1 to limit the retraction of the outer leg member 5 into the body (see FIGS. 1, 5 and 6).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Landing gear for a vehicle comprising:
   a body for attachment to a vehicle;
   an adjustable-length leg carried by the body for up and down movement relative to the body as attached to the vehicle;
   said adjustable-length leg comprising an outer tubular member and an inner member telescopically slidable in the outer tubular member to any one of a plurality of adjusted positions relative to the outer tubular member for adjustment of the length of the leg;
   means for fine adjustment of the leg as a whole lengthwise relative to the body; and
   means for releasably locking the inner member in any one of said plurality of adjusted positions relative to the outer tubular member comprising:
   a first series of pin-receiving openings in one side of said inner member spaced at intervals along its length;
   a second series of pin-receiving openings in the opposite side of said inner member spaced at intervals along its length corresponding to the spacing of the openings of the first series;
   each opening of each series being aligned with an opening of the other;
   first and second holes in the outer tubular member at opposite sides thereof, the first hole being coplanar with the first series of pin-receiving openings in the inner member, the second being coplanar with the second series of pin-receiving openings in the inner member;
   first and second tubular pin guides extending laterally outwardly from the outer tubular member coaxial with the holes in the outer tubular member at opposite sides of said outer tubular member;
   each pin guide having an open inner end at the outer tubular member and an outer end spaced outwardly from the outer tubular member;
   a first pin axially slidable in the first pin guide between a locking position extending into one of the pin-receiving openings of the first series in the inner member and a retracted position;
   a second pin axially slidable in the second pin guide between a locking position extending into one of the pin-receiving openings of the second series in the inner member and a retracted position;
   said pins being coaxial and each having an outer end portion adjacent the outer end of the respective guide;
   a handle comprising a generally U-shaped spring member having a hand grip portion and spring arms extending laterally from the hand grip portion;
   said spring arms having free end portions interconnected with the outer end portions of the pins and exerting a spring bias on the pins tending to move them inwardly to their locking positions;

said handle being swingable about the axis of the pins between a first and a second position; and means for effecting outward movement of the pins in the guides from their locking position to their retracted position against the said spring bias of the arms on the pins on swinging movement of the handle from its first to its second position and allowing inward movement of the pins in the guides from their retracted to their locking position under the said spring bias of the arms on the pins on swinging movement of the handle from its second to its first position.

2. Landing gear as set forth in claim 1 wherein the pins are rotatable in the guides as well as axially slidable in the guides, wherein the spring arms extend through holes in the outer end portions of the pins, the pins rotating on their axis in the guides on swinging the handle one way or the other, wherein the guides are open at their outer ends and the means for effecting the outward movement of the pins to their retracted position comprises a cam formation at the outer end of each guide, the spring arms engaging these cam formations and being cammed out to move the pins out when the handle is swung from its first to its second position and being allowed to move in when the handle is swung from its second to its first position.

3. Landing gear as set forth in claim 2 wherein the cam formation at the outer end of each guide comprises a pair of generally V-shaped notches in the end of the guide spaced at 180° intervals around the end of the guide, the end of each arm riding up one of the sides of the respective notches and thus being cammed outwardly when the handle is swung from its first to its second position.

4. Landing gear as set forth in claim 3 wherein the first position of the handle is a raised position and the second position is a lowered position.

5. Landing gear as set forth in claim 4 wherein the formation at the outer end of each guide includes a pair of detent notches located between the V-shaped notches, the ends of the arms being received in the detent notches for detaining the handle in its said second position wherein the pins are retracted.

6. Landing gear as set forth in claim 5 wherein each pin guide is formed from an originally flat blank of sheet metal which is formed into a cylinder with edges of the blank contiguous along a line extending lengthwise of the cylinder.

7. Landing gear as set forth in claim 1 wherein the inner leg member is a tubular member and wherein said landing gear has a spring extending lengthwise within the inner tubular leg member interconnected between the outer tubular leg member and the inner tubular leg member biasing the inner tubular leg member for retraction in the outer leg member.

8. Landing gear as set forth in claim 1 wherein the body comprises a tubular member, the outer tubular leg member is slidable axially in the body, and the inner tubular leg member is axially slidable in the outer tubular member, and wherein the means for fine adjustment of the adjustable-length leg as a whole comprises a nut secured to the outer tubular leg member adjacent its upper end, and a screw in threaded interconnection with the nut extending axially in the body and in the inner tubular leg member, means in the body above the upper end of the outer tubular leg member journalling the screw for rotation on its axis, the screw extending down from the nut within the inner tubular leg member and coaxial therewith, means accessible outside the body for rotating the screw to move up and down the nut, the outer tubular leg member which is interconnected with the nut, and the inner tubular member when locked by the pins to the outer tubular member, the spring being a tension spring interconnected between the nut and the inner tubular member adjacent its lower end biasing the inner tubular member to slide up in the outer tubular member.

9. Landing gear as set forth in claim 8 wherein the spring is a coil tension spring surrounding the screw.

10. Landing gear as set forth in claim 9 wherein the nut has a tubular stem extending downwardly in the inner tubular leg formed adjacent its lower end with a boss and wherein the upper end of the spring surrounds the stem with a convolution of the spring above the boss engaging the boss to hold the spring from being pulled down off the stem.

11. Landing gear as set forth in claim 9 wherein the inner tubular member has a foot comprising a plate at its lower end and wherein the spring at its lower end is interconnected with the foot plate by being formed with an eye at its lower end and by providing a clip on the bottom of the foot plate having an inverted U-shaped portion extending up through an opening in the foot plate received in the eye.

12. Landing gear as set forth in claim 1 having means for preventing the inner leg member from sliding all the way out of the outer tubular leg member.

13. Landing gear as set forth in claim 12 wherein the inner leg member is a tubular member and said means for preventing it from sliding all the way out of the outer tubular leg member comprises a detent mounted on the inside of the inner tubular leg member having a locking finger extending through an opening in the inner tubular leg member, said detent being movable to move the finger between a retracted position engaging the inside surface of the outer tubular leg member and a locking position projecting outward from the outside surface of the inner tubular leg member, and being biased to move in the direction for moving the finger out to its locking position, said outer tubular leg member having a locking opening adjacent its lower end, the finger moving into said locking opening and being engageable with the bottom of the locking opening when the inner tubular member is slid down in the outer tubular member to a position where the finger is in register with said opening.

14. Landing gear for a vehicle comprising:
a body for attachment to a vehicle;
an adjustable-length leg carried by the body for up and down movement relative to the body as attached to the vehicle;
said adjustable-length leg comprising an outer tubular member and an inner tubular member telescopically slidable in the outer tubular member to any one of a plurality of adjusted positions relative to the outer tubular member for adjustment of the length of the leg;
means for fine adjustment of the leg as a whole lengthwise relative to the body;
means for releasably locking the inner member in any one of said plurality of adjusted positions relative to the outer tubular member;
wherein;
the body comprises a tubular member;
the outer tubular leg member is slidable axially in the body;

the inner tubular leg member is axially slidable in the outer tubular member; and the means for fine adjustment of the adjustable-length leg as a whole comprises a nut secured to the outer tubular leg member adjacent its upper end;

a screw in threaded interconnection with the nut extending axially in the body and in the inner tubular leg member;

means in the body above the upper end of the outer tubular leg member journalling the screw for rotation on its axis, the screw extending down from the nut within the inner tubular leg member and coaxial therewith;

means accessible outside the body for rotating the screw to move up and down the nut, the outer tubular leg member which is interconnected with the nut, and the inner tubular member when locked by said locking means to the outer tubular member;

said landing gear further having spring means biasing the inner tubular member to slide up in the outer tubular member;

wherein the spring means comprises a coil tension spring surrounding the screw interconnected between the nut and the inner tubular member.

15. Landing gear as set forth in claim 14 wherein the nut has a tubular stem extending downwardly in the inner tubular leg formed adjacent its lower end with a boss and wherein the upper end of the spring surrounds the stem with a convolution of the spring above the boss engaging the boss to hold the spring from being pulled down off the stem.

16. Landing gear as set forth in claim 15 wherein the inner tubular member has a foot comprising a plate at its lower end and wherein the spring at its lower end is interconnected with the foot plate by being formed with an eye at its lower end and by providing a clip on the bottom of the foot plate having an inverted U-shaped portion extending up through an opening in the foot plate received in the eye.

17. Landing gear for a vehicle comprising:
a body for attachment to a vehicle;
an adjustable-length leg carried by the body for up and down movement relative to the body as attached to the vehicle;
said adjustable-length leg comprising an outer tubular member and an inner tubular member telescopically slidable in the outer tubular member to any one of a plurality of adjusted positions relative to the outer tubular member for adjustment of the length of the leg;
means for fine adjustment of the leg as a whole lengthwise relative to the body;
means for releasably locking the inner member in any one of said plurality of adjusted positions relative to the outer tubular member; and
means within the inner tubular leg member for preventing it from sliding all the way out of the outer tubular leg member;

wherein said means for preventing said inner tubular leg member from sliding all the way out of the outer tubular leg member comprises a detent mounted on the inside of the inner tubular leg member having a locking finger extending through an opening in the inner tubular leg member, said detent being movable to move the finger between a retracted position engaging the inside surface of the outer tubular leg member and a locking position projecting outward from the outside surface of the inner tubular leg member, and being biased to move in the direction for moving the finer out to its locking position, said outer tubular leg member having a locking opening adjacent its lower end, the finger moving into said locking opening and being engageable with the bottom of the locking opening when the inner tubular member is slid down in register with said opening.

18. Landing gear for a vehicle comprising:
a body for attachment to a vehicle;
an adjustable-length leg carried by the body for up and down movement relative to the body as attached to the vehicle;
said adjustable-length leg comprising an outer tubular member and an inner tubular member telescopically slidable in the outer tubular member to any one of a plurality of adjusted positions relative to the outer tubular member for adjustment of the length of the leg;
means for fine adjustment of the leg as a whole lengthwise relative to the body;
means for releasably locking the inner member in any one of said plurality of adjusted positions relative to the outer tubular member; and
means within the inner tubular leg member for preventing it from sliding all the way out of the outer tubular leg member;
wherein said means for preventing said inner tubular member from sliding all the way out of the outer tubular member compresses a detent member carried by the inner tubular leg member movable between a retracted position engaging the inside surface of the outer tubular leg member and a locking position projecting outward from the outside surface of the inner tubular leg member, and being biased to move in the direction for moving it out to its locking position, said outer tubular leg member having an opening adjacent its lower end, said opening having a bottom and a top, the detent member moving into said opening and being engageable with the bottom of said opening when the inner tubular member is slid down in the outer tubular member to a position wherein the detent member is in register with said opening, and being engageable with the top of said opening when the inner tubular member is raised relative to the outer tubular member for being moved to its said retracted position.

* * * * *

UNITED STATES PATENT AND TRADEMARK OFFICE
CERTIFICATE OF CORRECTION

PATENT NO. : 5,423,518
DATED : June 13, 1995
INVENTOR(S) : Bobby G. Baxter et al.

It is certified that error appears in the above-identified patent and that said Letters Patent is hereby corrected as shown below:

Column 12, claim 17, line 12, "finer" should read ---finger---.

Column 12, claim 17, lines 17-18, "slid down in register" should read ---slid down in the outer tubular member to a position where the finger is in register---.

Signed and Sealed this

Seventh Day of May, 1996

Attest:

BRUCE LEHMAN

*Attesting Officer*    *Commissioner of Patents and Trademarks*